United States Patent
Sameer

(10) Patent No.: US 11,367,252 B2
(45) Date of Patent: Jun. 21, 2022

(54) SYSTEM AND METHOD FOR GENERATING LINE-OF-SIGHT INFORMATION USING IMAGERY

(71) Applicant: HERE GLOBAL B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/061,007

(22) Filed: Oct. 1, 2020

(65) Prior Publication Data
US 2022/0108521 A1  Apr. 7, 2022

(51) Int. Cl.
G06T 15/60 (2006.01)
G06T 7/70 (2017.01)
G06T 19/20 (2011.01)
G06T 7/60 (2017.01)

(52) U.S. Cl.
CPC ........... *G06T 15/60* (2013.01); *G06T 7/60* (2013.01); *G06T 7/70* (2017.01); *G06T 19/20* (2013.01); *G06T 2207/10032* (2013.01); *G06T 2210/21* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 5,943,164 A * | 8/1999 | Rao ................. G06T 7/507 703/2 |
| 8,437,554 B2 | 5/2013 | Kim et al. |
| 10,636,166 B1 * | 4/2020 | Armstrong ............. G06T 7/337 |
| 2007/0115284 A1 * | 5/2007 | Kim .................. G06T 7/70 345/426 |
| 2008/0310756 A1 | 12/2008 | Tao et al. |

(Continued)

FOREIGN PATENT DOCUMENTS

| CN | 101894382 A | 11/2010 |
| CN | 103791885 A | 5/2014 |

OTHER PUBLICATIONS

S. Hornillo-Mellado et al., "Prediction of Satellite Shadowing in Smart Cities with Application to IoT", Sensors 2020, Jan. 14, 2020, 1-19, vol. 20, 475.

(Continued)

*Primary Examiner* — Jennifer Mehmood
*Assistant Examiner* — Jed-Justin Imperial
(74) *Attorney, Agent, or Firm* — HERE Technologies

(57) ABSTRACT

A system, method and computer program product are provided for generating line-of-sight information using imagery. In some aspects, the method includes receiving a raster image depicting at least one object in a region of interest, and measuring a shadow of the at least one object in the raster image. The method also includes determining an angle of the sun from the shadow of the at least one object, and creating a plurality of virtual shadows for the at least one object using the angle of the sun. The method further includes generating line-of-sight information for the at least one object based on an intersection of the plurality of virtual shadows with objects in the region of interest.

20 Claims, 11 Drawing Sheets

(56) References Cited

U.S. PATENT DOCUMENTS

2010/0254595 A1\* 10/2010 Miyamoto ............. G06V 20/58
382/192
2021/0049382 A1\* 2/2021 Naser ...................... G06T 7/215

OTHER PUBLICATIONS

K. Boeing, "Shade Angles", Web page <https://www.boeingconsult.com/Environment/shade-angle.htm>, retrieved on Mar. 30, 2020.
Lorup et al., "Line-of-sight Problem", Web page <http://www.gitta.info/TerrainAnalyi/en/html/VisibilAppls_learningObject2.xhtml>, retrieved on Mar. 30, 2020.
"Line of Sight Calculator", Web page <https://www.everythingrf.com/rf-calculators/line-of-sight-calculator>, retrieved on Mar. 30, 2020.

\* cited by examiner

400

400

SYSTEM AND METHOD FOR GENERATING LINE-OF-SIGHT INFORMATION USING IMAGERY

BACKGROUND

The present disclosure relates generally to image processing and mapping applications and services, and more specifically to systems and methods for generating line-of-sight information using imagery.

Line-of-sight is represented by a straight line between two points along which an observer has unobstructed vision. Line-of-sight information is important for a wide variety of applications. For instance, some signal transmission or communication (e.g. FM radio, microwave, 5G etc) require unimpeded propagation of signals between receiver and transmission stations, such as ground-based stations, cell-towers, satellites and so forth. Also, billboard advertisement, transportation, navigation, and other applications rely on clear unobstructed views between various points in space. For these applications, light-of-sight information would be critically important in optimizing the placement of communication equipment, advertisement, signs, and so forth.

Conventional tools calculate line-of-sight between different points using their respective positions in 3D space and the positions of obstructions (e.g. surfaces or objects) in between. To map line-of-sight, existing techniques often utilize Light Detection and Ranging (LiDAR) point-cloud data and high-resolution street level imagery. However, such conventional approach can be time-consuming and costly, particularly when looking at many objects and features over large scales, such as an entire city or large neighborhood.

Therefore, there is a need for improved technologies to determine visibility and line-of-sight information.

SUMMARY

The present disclosure overcomes the shortcomings of prior technologies. In particular, a novel approach for generating light-of-sight information from imagery is provided, as detailed below.

In accordance with aspect of the disclosure, a method for generating light-of-sight information using imagery is provided. The method includes receiving a raster image depicting at least one object in a region of interest, and measuring a shadow of the at least one object in the raster image. The method also includes determining an angle of the sun from the shadow of the at least one object, and creating a plurality of virtual shadows for the at least one object using the angle of the sun. The method further includes generating line-of-sight information for the at least one object based on an intersection of the plurality of virtual shadows with objects in the region of interest.

In accordance with aspect of the disclosure, a system for generating light-of-sight information using imagery is provided. The system includes at least one processor and at least one memory comprising instructions executable by the at least one processor. The instructions cause the system to receive a raster image depicting at least one object in a region of interest, measure a shadow of the at least one object in the raster image, determine an angle of the sun from the shadow of the at least one object. The instructions also cause the system to create a plurality of virtual shadows for the at least one object using the angle of the sun, and generate line-of-sight information for the at least one object based on an intersection of the plurality of virtual shadows with objects in the region of interest. The instructions further cause the system to generate a report comprising the line-of-sight information. The system also includes a display for providing the report to a user.

In accordance with yet another aspect of the disclosure, a non-transitory computer-readable storage medium, carrying one or more sequences of one or more instructions which, when executed by one or more processors, cause an apparatus to perform steps to receive a raster image depicting at least one object in a region of interest, and measure a shadow of the at least one object in the raster image. The instructions also cause the system to determine an angle of the sun from the shadow of the at least one object, and create a plurality of virtual shadows for the at least one object using the angle of the sun. The instructions further cause the system to generate line-of-sight information for the at least one object based on an intersection of the plurality of virtual shadows with objects in the region of interest, generate a report comprising the line-of-sight information, and transmit or cause a presentation of the report.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention will hereafter be described with reference to the accompanying figures, wherein like reference numerals denote like elements. The embodiments of the invention are illustrated by way of example, and not by way of limitation, in the accompanying drawings.

DETAILED DESCRIPTION

Light-of-sight information can be critically important in mapping, telecommunications, advertisement, navigation, and other fields of technology. For example, line-of-sight information can be used to optimize the placement of communication equipment, advertisement, signs, and so forth. Prior techniques for producing line-of-sight information can be time-consuming and costly, particularly for applications at large scales.

The present disclosure describes a solution to address such technical challenges. Specifically, systems and methods are provided herein for generating line-of-sight information using imagery. Unlike conventional techniques, the present approach utilizes shadows of objects depicted in imagery to generate light-of-sight. Specifically, by using based on the angle of the sun determined from the shadows, creates virtual shadows by simulating the position of the sun. Light-of-sight information for the objects may then be obtained using the virtual shadows.

As appreciated from description herein, the present approach provides a number of advantages and improvements over prior technologies. For instance, the present system and method may be used to generate accurate line-of-sight information from any imagery, including low-resolution images, satellite images, aerial images and so forth. In addition, unlike prior approaches, dependency on LiDAR and street-level imagery is not required. Moreover, the present approach may be automated, scalable, and capable of generating line-of-sight information from a single image of a region of interest (e.g. a raster image).

In the following description, and for the purposes of explanation, numerous specific details are set forth to provide a thorough understanding of the embodiments of the invention. It should be apparent to one skilled in the art, however, that the embodiments of the invention may be practiced with or without these specific details, or with equivalent arrangements. In other instances, well-known structures and devices are shown in block diagram form in order to avoid unnecessarily obscuring the embodiments of the invention.

Figure 1:
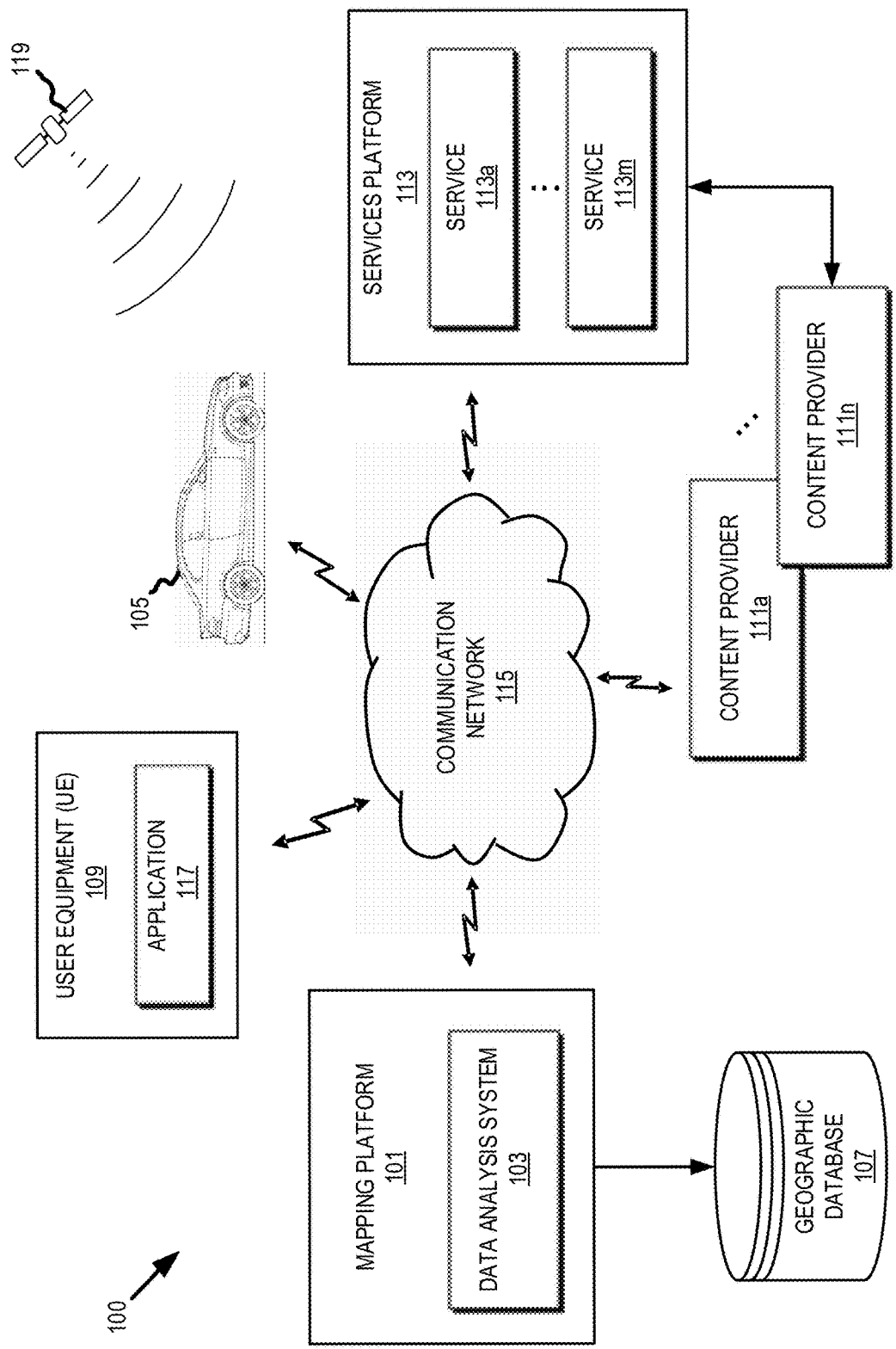
FIG. 1 is a diagram of an example system, in accordance with aspects of the present disclosure.

Referring particularly to FIG. 1, a schematic diagram of a system 100, in accordance with aspects of the present disclosure, is shown. In general, the system 100 may be any device, apparatus, system, or a combination thereof, that is configured to carry out steps for generating line-of-sight information. Specifically, the system 100 may include, be part of, or operate in collaboration with, various computers, systems, devices, machines, mainframes, networks, servers, databases, and so forth. In some embodiments, the system 100 may also include portable or mobile terminals or devices, such as cellular phones, smartphones, laptops, tablets, and the like. In this regard, the system 100 may be designed to integrate a variety of hardware, software, and firmware with various capabilities and functionalities. In addition, the system 100 may be capable of operating autonomously or semi-autonomously.

In some embodiments, the system 100 may include a mapping platform 101 configured to generate and process a variety of mapping information and data, as well as carry out steps in accordance with methods described herein. In addition, the mapping platform 101 may also communicate and exchange information and data with a variety of other systems, devices and hardware. For instance, as shown in FIG. 1, the mapping platform 101 may communicate with one or more vehicle(s) 105, geographic database(s) 107, user equipment (UE) 109, content provider(s) 111, and/or services platform(s) 113 by way of a communication network 115.

To carry out processing steps, in accordance with aspects of the present disclosure, the mapping platform 101, and components therein, may execute instructions or sequences of instructions stored in a non-transitory computer-readable medium (not shown in FIG. 1). The non-transitory computer-readable medium may be part of a memory, database, or other data storage location(s). To execute the instructions, the mapping platform 101 may include, and utilize a programmable processor, or combination of programmable processors. Alternatively, or additionally, the mapping platform 101, and components therein, may also include and utilize one or more dedicated processors, or processing units, modules or systems that are specifically configured (e.g. hardwired, or pre-programmed) to carry out steps, in accordance with methods described herein. In addition, the mapping platform 101 may further include, and/or share, a variety of interconnected components, including servers, intelligent networking/computing devices and other components, as well as corresponding software and/or firmware. By way of example, processing steps may be carried out using any combination of central processing units (CPUs), graphics processing units (GPUs), Digital Signal Processing (DSP) chips, Application Specific Integrated Circuits (ASICs), Field Programmable Gate Arrays (FPGAs), and so forth.

In some embodiments, the mapping platform 101 may include a data analysis system 103, as illustrated in FIG. 1. Although the data analysis system 103 is shown as being part of the mapping platform 101, the data analysis system 103 may be a stand-alone system. Alternatively, the data analysis system 103 may be a part of the vehicle 105, UE 109, services platform 113 or services 113a-m, or a combination thereof.

In some implementations, the data analysis system 103 may be configured to receive or access imaging, along with other data and information, and process the imaging, data and information to generate line-of-sight information. In some implementations, the data analysis system 103 may be configured to process one or more images (e.g. raster images) depicting one or more objects in a region of interest. For instance, the data analysis system 103 may detect pre-determined or defined objects depicted in the image(s), such as shadows cast by various objects (e.g. buildings, structures, etc) The data analysis system 103 may then use the shadows identified in imagery to generate line-of-sight information. As detailed below, the data analysis system 103 may measure the object shadows, and determine the angle of the sun when the shadows were cast. Based on the sun angle, a number of virtual shadows may be generated. In some aspects, the virtual shadows may be generated by determining a maximum angle of the sun. The data analysis system 103 may then use the virtual shadows to generate the line-of-sight information.

As shown in FIG. 1, the mapping platform 101 and/or data analysis system 103 may have connectivity or access to a geographic database 107. Specifically, the geographic database 107 may store various geographical data and information in a variety of forms and formats. For instance, in one embodiment, the geographic database 107 may include images or image data (e.g. terrestrial, aerial, and so forth), drive data and so forth. The geographic database 107 may also include other data and information, including representations of various features or objects, such as buildings, structures, shadows, and so forth.

In addition, the mapping platform 101 may also communicate with UE 109 and/or a vehicle 105. In one embodiment, the UE 109, or alternatively the vehicle 105, may execute an application 117 (e.g. a software application) configured to carry out steps in accordance with methods described here. For instance, in one non-limiting example, the application 117 may carry out steps for generating line-of-sight information and reporting results. In another non-limiting example, application 117 may also be any type of application that is executable on the UE 109 and/or vehicle 105, such as autonomous driving applications, mapping applications, location-based service applications, navigation applications, content provisioning services, camera/imaging application, media player applications, social networking applications, calendar applications, and the like. In yet another non-limiting example, the application 117 may act as a client for the data analysis system 103, and perform one or more functions associated with generating line-of-sight information, either alone or in combination with the data analysis system 103.

By way of example, the UE 109 may be, or include, an embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 109 may support any type of interface with a user (e.g. by way of various buttons, touch screens, consoles, displays, speakers, "wearable" circuitry, and other I/O elements or devices). Although shown in FIG. 1 as being separate from the vehicle 105, in some embodiments, the UE 109 may be integrated into, or part of, the vehicle 105.

In some embodiments, the UE 109 and/or vehicle 105 may include various sensors for acquiring a variety of different data or information. For instance, the UE 109 and/or vehicle 105 may include one or more camera/imaging devices for capturing imagery (e.g. terrestrial images), global positioning sensors (GPS) for gathering location or coordinates data, network detection sensors for detecting wireless signals, receivers for carrying out different short-range communications (e.g., Bluetooth, Wi-Fi, Li-Fi, near field communication (NFC) etc.), temporal information sensors, audio recorders for gathering audio data, velocity sensors, switch sensors for determining whether one or more vehicle switches are engaged, and others.

The UE 109 and/or vehicle 105 may also include light sensors, height sensors and accelerometers (e.g., for determining acceleration and vehicle orientation), tilt sensors (e.g. for detecting the degree of incline or decline), moisture sensors, pressure sensors, and so forth. Further, the UE 109 and/or vehicle 105 may also include sensors for detecting the relative distance of the vehicle 105 from a lane or roadway, the presence of other vehicles, pedestrians, traffic lights, potholes and any other objects, or a combination thereof. Other sensors may also be configured to detect weather data, traffic information, or a combination thereof. Yet other sensors may also be configured to determine the status of various control elements of the car, such as activation of wipers, use of a brake pedal, use of an acceleration pedal, angle of the steering wheel, activation of hazard lights, activation of head lights, and so forth.

In some embodiments, the UE 109 and/or vehicle 105 may include GPS or other satellite-based receivers configured to obtain geographic coordinates from a satellite 119 (FIG. 1) for determining current location and time. Further, the location can be determined by visual odometry, triangulation systems such as A-GPS, Cell of Origin, or other location extrapolation technologies.

The mapping platform 101 may also have connectivity with various content providers 111. Each content provider 111a-111n may send, or provide access to, various information or data to the data analysis system 103, vehicle 105, geographic database 107, user equipment 109, the services platform 113, and any combination thereof. The content provided may include map content (e.g., geographic data, parametric representations of mapped features, and so forth), textual content, audio content, video or image content (e.g. terrestrial image data), and so forth. In some implementations, the providers 111 may send, or provide access to, information or data for detecting and classifying various features/target points in image data, and estimating the quality of the detected features. In some implementations, the providers 111 may also receive and store content from the data analysis system 103, vehicle 105, geographic database 107, UE 109, services platform 113, and any combination thereof. The content providers 111 may also manage access to a central repository of data, and offer a consistent, standard interface to data, such as a repository of the geographic database 107.

As shown in FIG. 1, the mapping platform 101 may further connect over the communication network 115 to the services platform 113 (e.g. a third-party platform), which may provide one or more services 113*a*-*m*. By way of example, the services platform 113 may provide mapping services, navigation services, travel planning services, notification services, social networking services, content (e.g., audio, video, images, etc.) provisioning services, application services, storage services, contextual information determination services, location based services, information based services (e.g., weather, news, etc.), and so forth. In one embodiment, the services platform 113 may use the output of the data analysis system 103 (e.g., ground control point data) to localize the vehicle 105 or UE 109 (e.g., a portable navigation device, smartphone, portable computer, tablet, etc.), and provide services such as navigation, mapping, other location-based services, and so forth.

The communication network 115 may include any number of networks, such as data networks, wireless networks, telephony networks, or combinations thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The mapping platform 101, data analysis system 103, vehicle 105, geographic database 107, UE 109, content provider 111, and services platform 1113 may communicate with each other, and other components of the system 100, using various communication protocols. By way of example, protocols may include a set of rules defining how the network nodes within the communication network 115 interact with each other based on information and data sent over the communication links. The protocols may be effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information and data over a network are described in the Open Systems Interconnection (OSI) Reference Model.

Communications between the network nodes may be carried out by exchanging discrete packets of data. Each packet may comprise (1) header information associated with a particular protocol, and (2) payload information that follows the header information and contains information that may be processed independently of that particular protocol. In some protocols, the packet may include (3) trailer information following the payload and indicating the end of the payload information. The header may include information such as the source of the packet, its destination, the length of the payload, and other properties used by the protocol. The data in the payload for the particular protocol may include a header and payload for a different protocol associated with a different, higher layer of the OSI Reference Model. The header for a particular protocol may indicate a type for the next protocol contained in its payload. The higher layer protocol is said to be encapsulated in the lower layer protocol. The headers included in a packet traversing multiple heterogeneous networks, such as the Internet, may include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
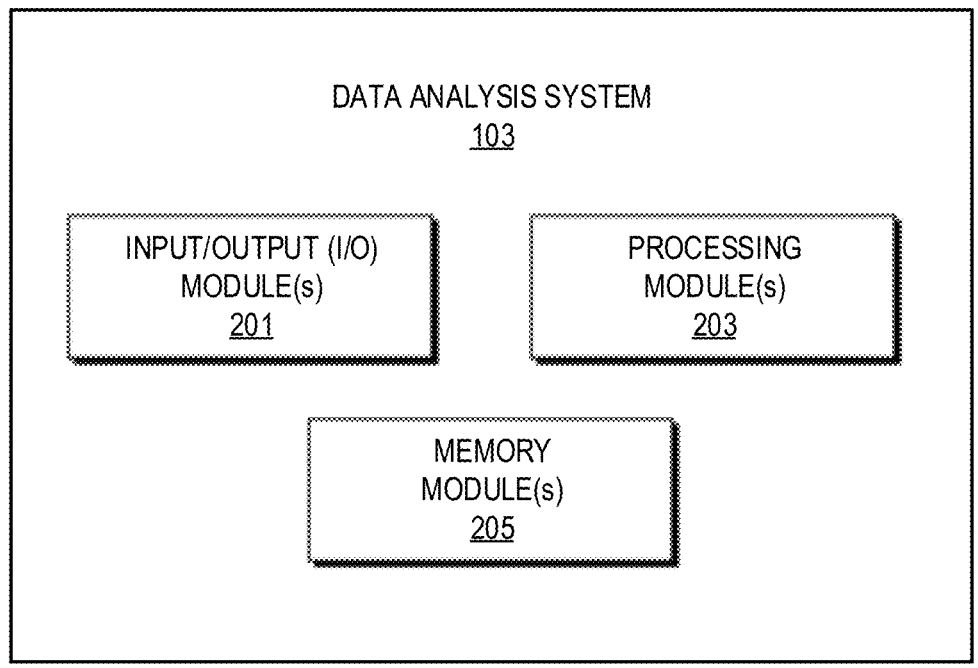
FIG. 2 is a diagram of an example data analysis system, in accordance with aspects of the present disclosure.

Referring now to FIG. 2, a schematic diagram of an example data analysis system 103, in accordance with aspects of the present disclosure, is illustrated. As shown in the figure, in some embodiments, the data analysis system 103 may include a number of input/output (I/O) module(s) 201, processing module(s) 203, data storage or memory module(s) 205, and possibly other modules and components. For instance, although not explicitly shown in FIG. 2, in some embodiments, the data analysis system 103 may also include a bus and/or communication network for passing data and information among the various components and modules of the analysis system 103.

The data analysis system 103 may be implemented using various hardware, firmware, software, as described with reference to the mapping platform 101 in FIG. 1. Alternatively, or additionally, the components and modules, and respective functionalities, may be implemented as a cloud-based service, local service, native application, or combination thereof. Although the modules in FIG. 2 are shown to be separate, it is contemplated that their respective functions may be readily combined into fewer modules, or further separated into more specialized modules.

The I/O module(s) 201 may include any combination of input and output elements for receiving and relaying various data and information. Example input elements may include a mouse, keyboard, touchpad, touchscreen, buttons, and other user interfaces configured for receiving various selections, indications, and operational instructions from a user. Input elements may also include various drives and receptacles, such as flash-drives, USB drives, CD/DVD drives, and other computer-readable medium receptacles, for receiving various data and information. Example output elements may include displays, touchscreens, speakers, LCDs, LEDs, and so on.

The I/O module(s) 201 may communicate with, and operate as directed by, one or more of the processing module(s) 203. In addition, I/O module(s) 201 may also include various communication hardware configured for exchanging data and information with various external computers, systems, devices, machines, mainframes, servers or networks, for instance. To this end, the I/O module(s) 201 may include a communication interface, which may include any means such as a device or circuitry embodied in either hardware or a combination of hardware and software that is configured to receive and/or transmit data from/to other electronic devices in communication with the navigation system. In this regard, the communication interface may include, for example, an antenna (or multiple antennas) and supporting hardware and/or software for enabling communications with a plurality of different types of networks, such as first and second types of networks. Additionally or alternatively, the communication interface may include the circuitry for interacting with the antenna(s) to cause transmission of signals via the antenna(s) or to handle receipt of signals received via the antenna(s). In some implementations, the I/O module(s) 201 may be configured to provide or transmit a report that includes line-of-sight information, among other data and information.

As shown in FIG. 2, the data analysis system 103 may include one or more processing module(s) 203, which can be embodied in a number of different ways. For example, the processing module(s) 203 may include one or more of various hardware processing means, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processing module(s) 203 may include one or more processors configured in tandem via a bus to enable independent execution of instructions, pipelining and/or multithreading.

The processing module(s) 203 may be in communication with the memory module(s) 205 via a bus. In some embodiments, the memory module(s) 205 may be non-transitory and may include, for example, one or more volatile and/or non-volatile memories. In other words, for example, the memory module(s) 205 may be an electronic storage device (for example, a computer readable storage medium) comprising gates configured to store data (for example, bits) that may be retrievable by a machine (for example, a computing device like the processing module(s) 203). The memory module(s) 205 therefore serves as a computer-readable storage medium, which refers to a physical storage medium (e.g., volatile or non-volatile memory device), and is differentiated from a computer-readable transmission medium, which refers to an electromagnetic signal. The memory module(s) 205 may be configured to store information, data, content, applications, instructions, or the like for carrying out various functions. For example, the memory module(s) 205 could be configured to buffer input data for processing by the processing module(s) 203. Additionally or alternatively, the memory module(s) 205 could be configured to store instructions for execution by the processing module(s) 203.

In an example embodiment, the processing module(s) 203 may be configured to execute instructions stored in the memory module(s) 205, or otherwise accessible to the processing module(s) 203. Alternatively or additionally, the processing module(s) 203 may be configured to execute hard coded functionality. As such, whether configured by hardware or software methods, or by a combination thereof, the processing module(s) 203 may represent an entity (for example, physically embodied in circuitry) capable of performing operations according to an embodiment while configured accordingly. Thus, for example, when one or more processing module(s) 203 is embodied as an ASIC, FPGA or the like, the processing module(s) 203 may be specifically configured with hardware for conducting certain functions, operations, and/or methods in accordance with aspects of the present disclosure. Alternatively, as another example, when one or more processing module(s) 203 is embodied as an executor of software instructions, the instructions may specifically configure the processing module(s) 203 to perform the algorithms and/or operations described herein when the instructions are executed. However, in some cases, one or more processing module(s) 203 may be a processor of a specific device (for example, a computing device) configured to carry out instructions for functions, operations and/or methods described herein. In some embodiments, the processing module(s) 203 may include, among other things, a clock, an arithmetic logic unit (ALU) and logic gates configured to support operation of the processor.

The processing module(s) 203 may be configured to receive or access imaging, along with other data and information, and process the imaging, data and information to generate line-of-sight information, in accordance with aspects of the present disclosure. In some implementations, the processing module(s) 203 may be configured to process one or more images (e.g. raster images) depicting one or more objects in a region of interest. For instance, in some aspects, the processing module(s) 203 may be configured to detect pre-determined or defined objects depicted in the image(s), such as shadows cast by various objects (e.g. buildings, structures, etc). In other aspects, shadow information may be accessed from a database. The processing module(s) 203 may then use the shadow information identified in imagery to generate line-of-sight information.

To identify the objects or features, the processing module(s) 203 may utilize various algorithms (e.g. computer vision or machine learning algorithms) and computing architectures. For instance, to identify shadows, the processing module(s) 203 may be configured to extract pixels from imagery, and identify pixels that correspond shadows, for example, by determining whether pixel values of extracted pixels are within a predetermined range. Pixels with values within the predetermined range are retained as representing shadows, while those having pixel value outside the range are eliminated as representing features other than shadows, such as buildings, terrain or other objects. As an example, pixel values that represent a black color or a color very nearly black may be considered to be representative of shadows. Thus, the predefined range may be defined to include pixel values representative of a black color, or colors that are nearly black. In some embodiments, retained pixels may then be used to generate a representation of shadows. The representation may be defined in any form, such as a shadow layer in a map, for example.

While a shadow identified from imagery provides a general approximation of the shape of the object casting the shadow, the shadow may have a shape or outline that varies appreciably from the object. Such variations may be due to a variety of factors, including shadows cast by other objects in the vicinity, such as trees, shrubs, vehicles, and so forth. And so, in some implementations, the processing module(s) 203 may modify or correct identified shadows by taking into considerations information associated with objects (e.g. buildings, structures, etc) producing the shadows. For instance, the processing module(s) 203 may be configured to modify the pixel values of pixels identified as shadows based upon a shape and other properties of the one or more objects, such as properties defined or represented in a map layer (e.g. a building layer) Thus, the representation of the shadow may be modified to have a shape that more accurately corresponds to one or more objects (e.g. buildings) in its proximity.

In some aspects, the representation of a shadow may be modified based upon the shape of objects. For instance, the representation of a shadow may be modified by translating a representation of one or more objects (e.g. buildings) toward an edge of the representation of the shadow. The direction and distance of translation may be determined in various manners. For example, the translation may be pre-defined or computed based upon the position and angle of the sun relative to the object(s) at the time at which the imagery was captured. In some aspects, the translation may be based upon the relative location of the representation of the shadow with respect to the representation of the object(s). Specifically, the direction and distance of translation may be such that the translation brings the representations of the shadow and object(s) into a close alignment. That is, upon translation, the representations are substantially overlapped (e.g. greater than 80% overlap, greater than 90% overlap, etc). In other aspects, the translation may be based on one or more heights of the objects. For instance, a pre-defined height of a building may be used to determine the distance of translation. If the object has different heights, then an average height may be used. In yet other aspects, the distance by which the object representation(s) is/are translated may be defined as a predefined multiple of the object height, such as 0.2 times the height, 0.1 times height, although other multiples may be possible. Once translated, the representation of the shadow may be modified such it has a shape substantially similar or identical to the shape of the one or more objects.

Referring again to FIG. 2, in some implementations, the processing module(s) 203 may be configured to analyze shadow information to ascertain a variety of information. For instance, the length and orientation of a shadow of an object identified from imagery (e.g. raster image) may be used to determine at least one angle and/or position of the sun at the moment when the imagery was captured. In some aspects, an angle of the sun is the elevational angle or altitude angle commonly measured from the horizontal plane To note, the position of the sun may also be determined based on an azimuthal angle, which commonly measured in the horizontal plane relative to a chosen coordinate system (e.g. North, South, East, West). In some aspects, a maximum angle may also be determined based on the angle of the sun. Additionally, or alternatively, shadow information accessed from a database, for instance, may be used to determine the angle and position of the sun. The angle of the sun determined from shadows may then be used by the processing module(s) 203 to create virtual shadows for the objects. In this computation, object height information may also be used. For example, object height may be accessed from a database (e.g. a map layer). The angle of the sun may then be used to compute a maximum angle of the sun, and create a number of virtual shadows. As detailed below, virtual shadows may then be used to generate line-of-sight information for various objects depicted in imagery.

The processing module(s) 203 may also be configured to provide processed data and information to respective modules of the data analysis system 103. For example, the processing module(s) 203 may be configured to generate and provide a report to be displayed to a user using the I/O module(s) 203. The report may also be stored in the memory module(s) 205, or transmitted to various systems, devices, databases and so forth, external to the data analysis system 103. The report may be in any form, and include various information. For instance, the report may include various visual and/or audio signals, images, illustrations, maps, tabulated information and data, instructions, and any combinations thereof.

In some aspects, the report may include a graphical illustration indicative of light-of-sight information. For instance, in one non-limiting example, the report may indicate line-of-sight information corresponding to one or more target objects by depicting on a map a number of lines, vectors, rays, bands, and the like, extending from each target objects in various directions (e.g. uniformly or non-uniformly around 360°). The length of such lines, vectors, rays or bands may be indicative of a distance for which each object has of clear view along any given direction. The illustration may also indicate various other map objects, features, attributes, and so on, either using one, two, three dimensions, or any combination thereof. In some implementations, the illustration may use color codes to distinguish different objects, lines, vectors, rays, bands, and so forth. In some aspects, the line-of-sight information may be generated and stored in a form that is suitable for mapping, such as in the form of a line-of-sight layer, a line layer, or an object layer (e.g. a building or structure layer).

Figure 3:
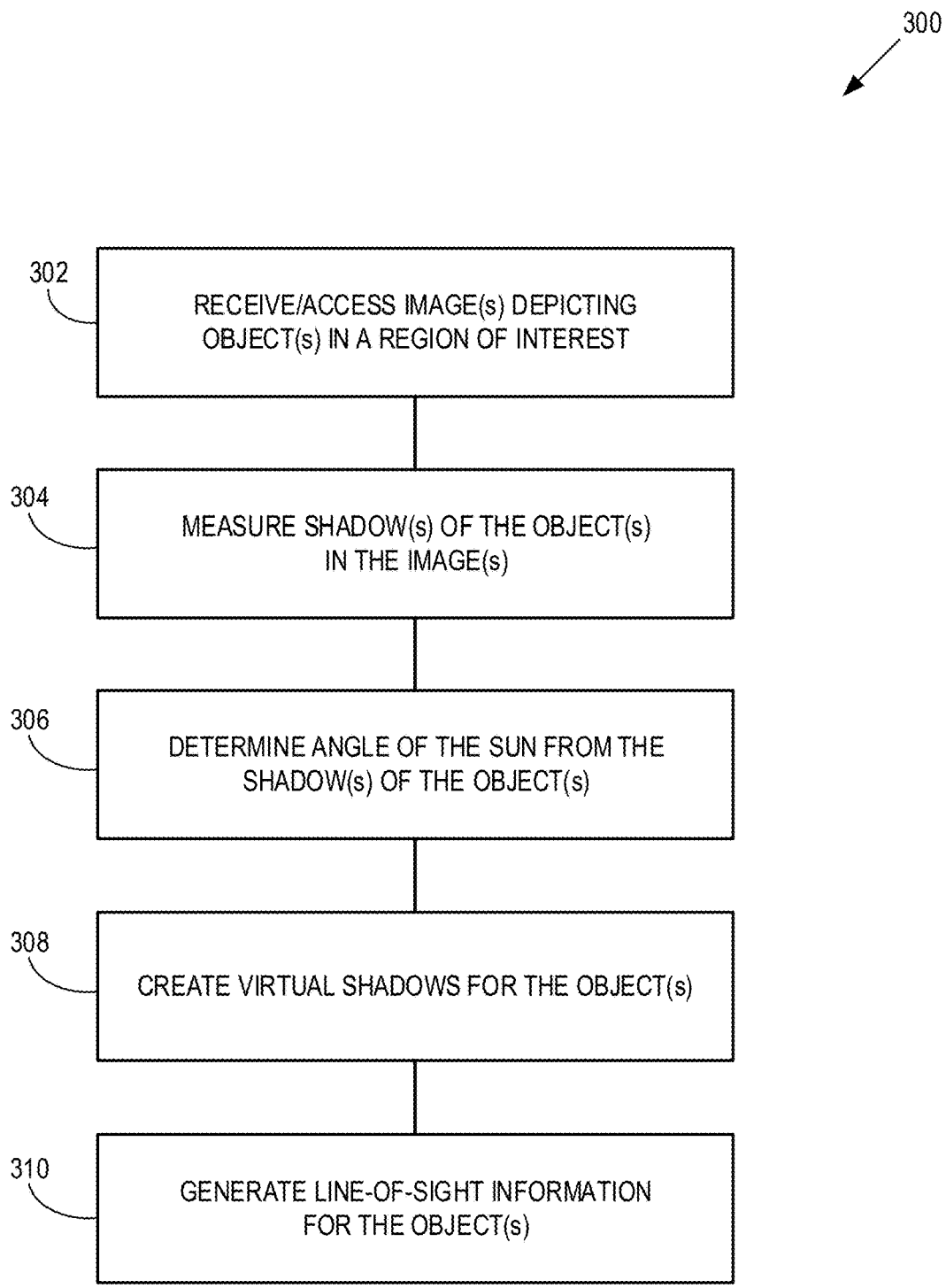
FIG. 3 is a flowchart setting forth steps of a process, in accordance with aspects of the present disclosure.

Turning now to FIG. 3, a flowchart setting forth steps of a process 300, in accordance with aspects of the present disclosure, is illustrated. Steps of the process 300 may be carried out using any combination of suitable devices or systems, as well as using systems described in the present disclosure. In some embodiments, steps of the process 300 may be implemented as instructions stored in non-transitory computer readable media, as a program, firmware or software, and executed by a general-purpose, programmed or programmable computer, processer or other computing device. In other embodiments, steps of the process 300 may be hardwired in any application-specific computer, processer, dedicated system, or module, as described with reference to FIGS. 1 and 2. Although the process 300 is illustrated and described as a sequence of steps, it is contemplated that the steps may be performed in any order or combination, and need not include all of the illustrated steps.

The process 300 may begin at process block 302 with receiving or accessing one or more images depicting one or more target objects in an area of interest. The image(s) may be captured in real-time and/or accessed from, for example, the geographic database 107, the vehicle 105, or a content provider 111, as described with reference to FIG. 1, as well as from elsewhere (e.g. a memory, server, and so forth). The image(s) may include one or more top-down images, aerial images, satellite images, drone images, and so forth, captured using various vehicles (e.g. airplanes, drones, satellites, and so forth). In some aspects, the image(s) received or accessed at process block 302 may include one or more raster images. In other aspects, the image(s) may include one or more low resolution images.

Then, as indicated by process block 304, one or more shadow(s) of the one or more target objects in the image(s) may be measured. Example measurements may include the length and orientation of the shadow(s). To obtain the measurements, shadow information may first be generated, as described. Specifically, the shadow(s) may be detected from imagery based on pixels having pixel values in a predetermined range. The identified pixels may then be used to generate a representation of the shadow(s). As described, the representation of the shadow(s) may also be modified or corrected using various object information, such as shape. Alternatively, or additionally, shadow information stored in a database, for example, in the form of a shadow layer, may be accessed to perform the measurement at process block 304.

The measurements of the shadow(s) may then be used to determine at least one angle and/or position of the sun at the moment when the imagery was captured, as indicated by process block 306. In some aspects, the angle of the sun, $\theta$, may be computed by using a shadow length, L, and a height, H, of the target object casting the shadow in the equation $\theta=\tan^{-1}(H/L)$. Based on the angle of the sun, a number of virtual shadows for the target object(s) may be created, as indicated by process block 308. In some aspects, a maximum angle, $\theta_{max}$, of the sun may be computed based on the angle and/or position of the sun. Optionally, other information may be utilized to compute the maximum angle, such as the position, height, elevation of the target object(s). The virtual shadows may then be created by simulating the position of the sun. In some aspects, the position of the sun is simulated to be at the maximum angle. In this manner, the virtual shadows may extend further from the object(s) compared to the shadows measured at process block 304. The virtual shadows may or may not be displayed on a screen or other output device.

In some aspects, the virtual shadows created for each target object are distributed uniformly around a circle in which the object is located as the center. For instance, in one non-limiting example, a virtual shadow is located every approximately 0.5°, 1°, 2°, or 5° around the 360° of a circle, although other values may be possible. Also, the virtual shadows may extend for a predetermined distance away from the center. For example, the virtual shadows may extend for a distance that corresponds to 0.1 km, 0.3 km, 0.5 km, and so forth, in real space. Other distance values may be possible. In some aspects, the distances may be different for the different virtual shadows created. In addition, the virtual shadows need not be distributed uniformly around a circle. For instance, in some aspects, the distribution may depend upon the presence or density of surrounding objects (e.g. buildings, structures, terrain, parking lots, etc).

The virtual shadows created at process block 308 may then be used to generate line-of-sight information for the target object(s), as indicated by process block 310. Specifically, an intersection between each virtual shadow and surrounding objects (e.g. buildings, structures, etc) may be determined. For example, since the virtual shadows may be represented using bands, the intersection may be determined based on an overlap (e.g. greater than 5% overlap, greater than 10% overlap, greater than 15% overlap, and so forth) between the bands and surface areas of surrounding objects. Alternatively, if the virtual shadows are represented using lines, rays or vectors, the intersection may be determined based on whether such lines, rays or vectors contact or come within a threshold distance from position of the surrounding objects. Once an intersection is determined to occur between a virtual shadow of a target object and one or more surrounding objects, the virtual shadow is modified or shortened so that it extends from the target object to the closest point of the intersection. In this manner, a number of modified virtual shadows that represent line-of-sight for each target object can generated. In some aspects, a confidence level for one or more of the modified virtual shadows or lines-of-sight may be generated at process block 308. The confidence level may be determined in a number of ways, and using various information. For instance, a confidence level for a given modified virtual shadow may be determined based on the degree of overlap between the respective virtual shadow and object(s) with which it intersects. The confidence level may also take into consideration a length and/or orientation of the virtual shadow.

In some implementations, modified virtual shadows are generated by extruding the virtual shadows and surrounding objects in 3D. For example, 3D buildings within 5 km, or within 10 km from a target object may be extruded. Areas of overlap between the virtual shadows and facades of the surrounding objects are determined, and the virtual shadows are modified based on the overlap. In some aspects, the modification may be performed manually, for example, using a clipping tool. Alternatively, the modification may be automated, performed, for example, using a machine learning process.

A report may also be generated at process block 310. The report may be displayed to a user by way of a user interface, stored in a memory, or transmitted to various systems, devices, databases and so forth. The report may be in any form, and include various information. For instance, the report may include various visual and/or audio signals, images, illustrations, maps, tabulated information and data, instructions, and any combinations thereof.

In some aspects, the report may include a graphical illustration indicative of light-of-sight information. For instance, in one non-limiting example, the report may indicate line-of-sight information corresponding to one or more target objects by depicting on a map a number of lines, vectors, rays, bands, and the like, extending from each target objects in various directions (e.g. uniformly or non-uniformly around 360°). The length, and optionally confidence level, of such lines, vectors, rays or bands may be indicative of a distance for which each object has of clear view along any given direction. The illustration may also indicate various other map objects, features, attributes, and so on, either using one, two, three dimensions, or any combination thereof. In some implementations, the illustration may use color codes to distinguish different objects, lines, vectors, rays, bands, and so forth. In some aspects, the line-of-sight information may generated and stored in a form that is suitable for mapping, such as a line-of-sight layer, a line layer, or an object layer (e.g. a building or structure layer).

Figure 4A:
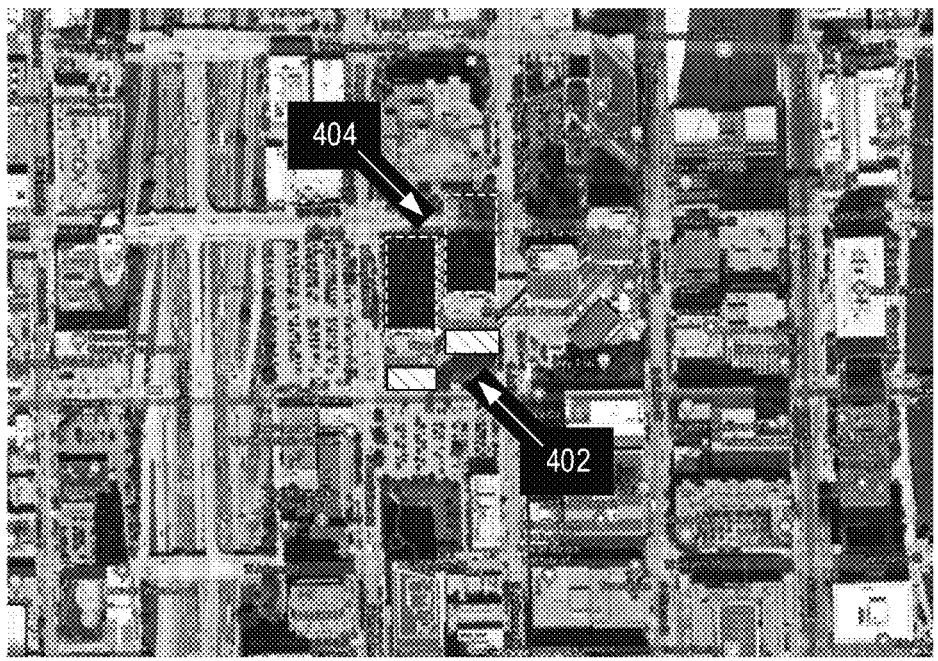
FIG. 4A is an illustration showing a non-limiting example of steps in the process of FIG. 3, in accordance with aspects of the present disclosure.
Figure 4B:
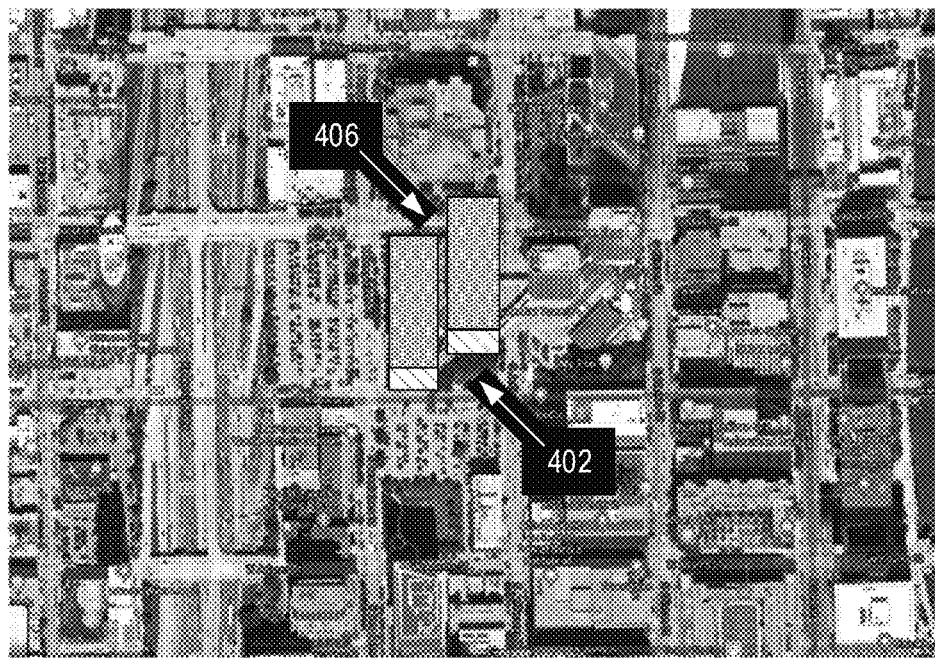
FIG. 4B is another illustration showing a non-limiting example of steps in the process of FIG. 3, in accordance with aspects of the present disclosure.

In one non-limiting example, FIGS. 4A-4F illustrate the process of obtaining line-of-sight information for one or more target objects. Specifically, FIG. 4A shows an image 400 in which two buildings 402 and their respective shadow regions 404 are highlighted. Based on the shadow regions 404, a number of shadows 406 may be identified and measured, as shown in FIG. 4B. As described, the shadows 406 may be detected from the image 400 by determining which pixels in the image have pixel values in a predetermined range. The identified pixels may then be used to generate a representation of the shadow 406, as shown in FIG. 4B. As described, the representation of the shadows 406 may also be modified or corrected using the shape of the buildings 402. To this end, building information (e.g. shape, height, etc) corresponding to the buildings 402 may be accessed, for example, from a database. Alternatively, or additionally, shadow information stored in a database, for example, in the form of a shadow layer, may be accessed to perform the measurement.

Figure 4C:
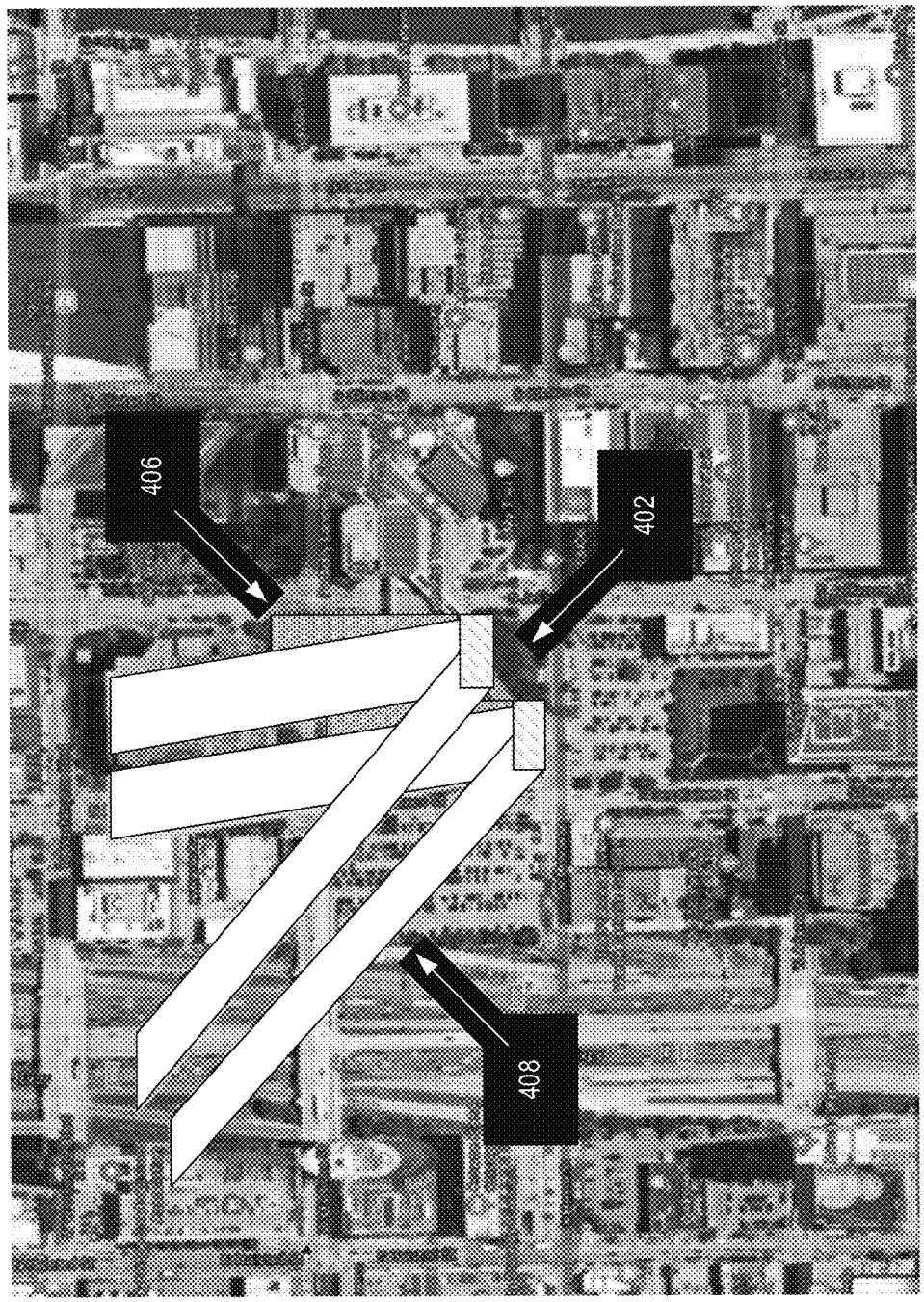
FIG. 4C is yet another illustration showing a non-limiting example of steps in the process of FIG. 3, in accordance with aspects of the present disclosure.
Figure 4D:
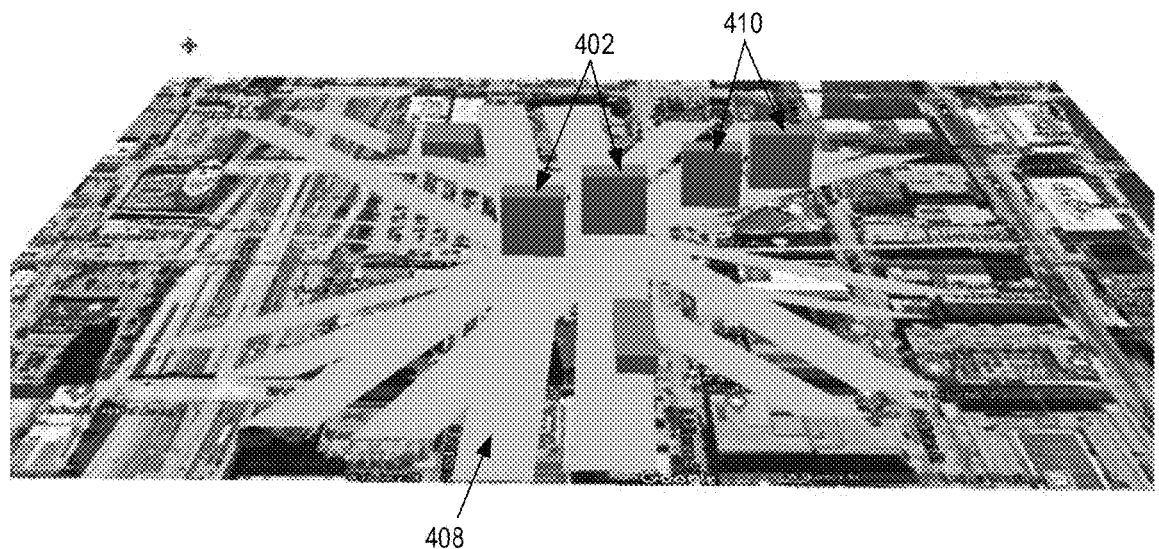
FIG. 4D is yet another illustration showing a non-limiting example of steps in the process of FIG. 3, in accordance with aspects of the present disclosure.

Based on the shadows 406 and height of the buildings 402, the angle and position of the sun when the image 400 was captured may be determined. The angle of the sun may then be used to create virtual shadows 408, as shown in FIG. 4C. To note, unlike the typical shadows that are produced when the sun follows 180° trajectory (i.e. from sunrise to sunset), the sun position can be simulated to follow a 360° pattern. For instance, one implementation might simulate the position of the sun at the maximum angle (e.g. close to a 0 or 180° elevational angle) and traversing a circular trajectory (i.e. 360° around an azimuthal angle). This would allow virtual shadows 408 generated therefrom to span the entire region around the buildings 402. Also, the virtual shadows 408 would extend farther than the shadows 406 cast by the buildings 402 in the image 400. Although FIG. 4C shows only a handful of virtual shadows 408 for ease of illustration, it may be appreciated that any number of virtual shadows 408 may be created, and distributed around the buildings 402 either uniformly or non-uniformly.

Figure 4E:
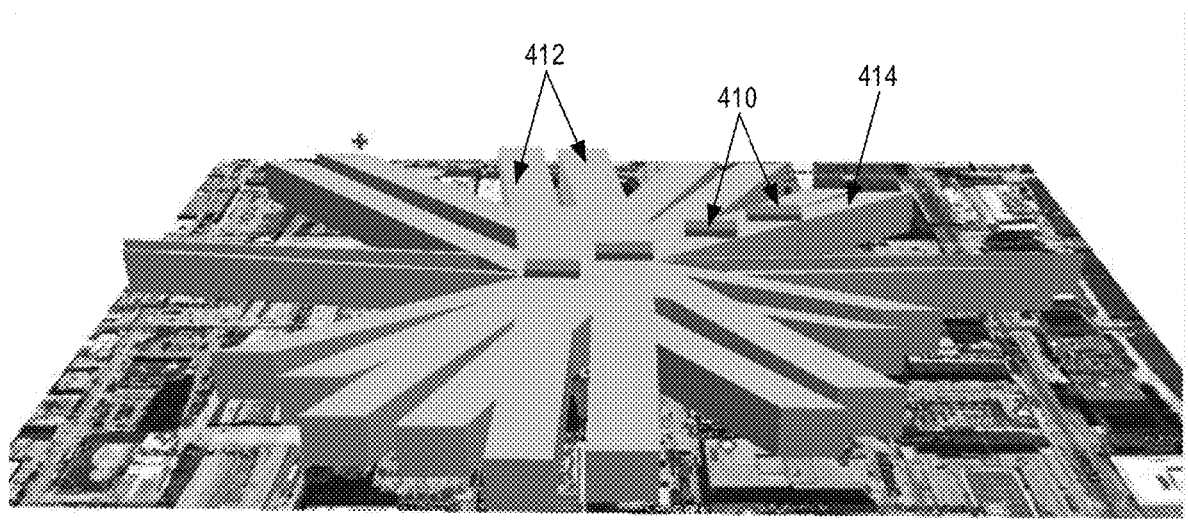
FIG. 4E is yet another illustration showing a non-limiting example of steps in the process of FIG. 3, in accordance with aspects of the present disclosure.
Figure 4F:
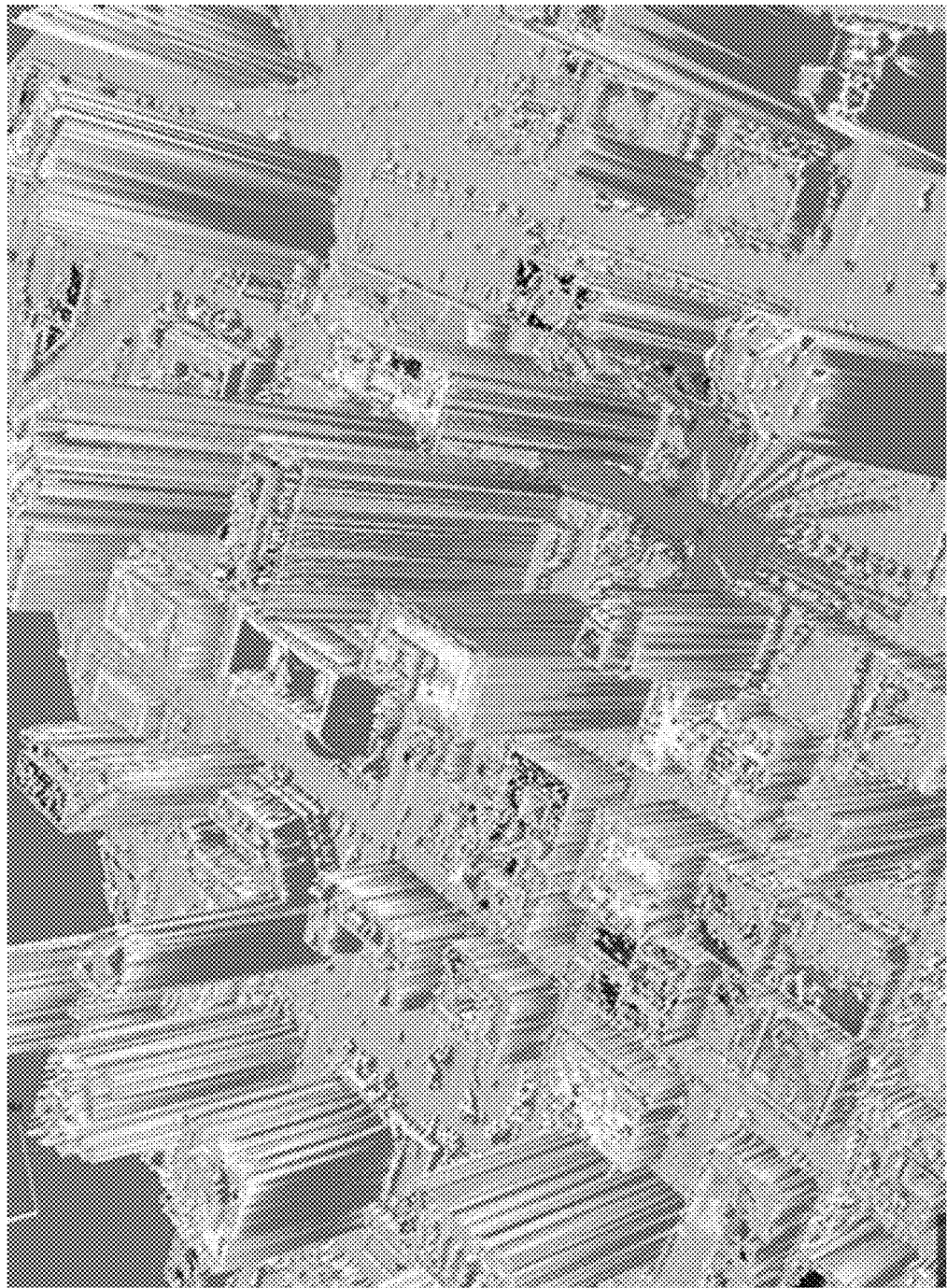
FIG. 4F is an illustration showing a non-limiting example of line-of-sight information, in accordance with aspects of the present disclosure.

An intersection of the virtual shadows 408 with various surrounding objects (e.g. surrounding buildings 410 in FIG. 4D) may then be determined. Referring specifically to FIG. 4E, the intersection may be determined by extruding the virtual shadows to create extruded shadows 412, and then modifying the extruded shadows 412. For instance, in order to generate the modified virtual shadows, a clipping tool, or another approach, may be used to remove portions 414 of the extruded shadows 412 based on the intersection of the extruded shadows 412 with the surrounding buildings 410. In this manner, line-of-sight information may be generated and provided. In some aspects, line-of-sight information may be provided in a 3D rendering, as illustrated in the non-limiting example of FIG. 4F.

Figure 5:
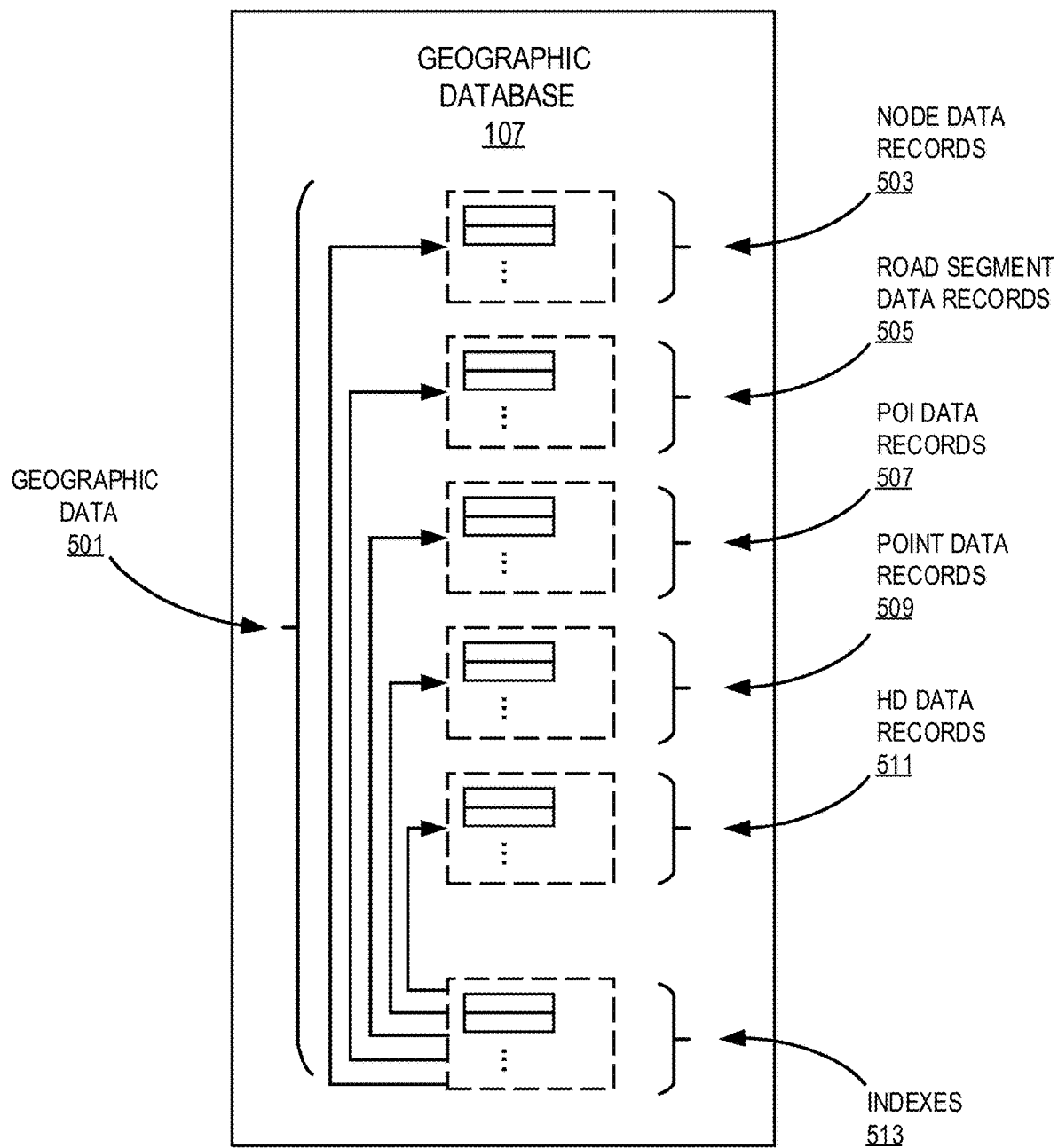
FIG. 5 is a diagram of an example geographic database, in accordance with aspects of the present disclosure.

Turning now to FIG. 5, a diagram of a geographic database 107, according to aspects of the present disclosure, is shown. As shown, the geographic database 107 may include a variety of geographic data 501 tabulated in various arrangements, and used in various applications. For example, the geographic data 501 may be used for (or configured to be compiled to be used for) mapping and/or navigation-related services. As shown in FIG. 1, the geographic data 501 may include node data records 503, road segment data records 505, point of interest (POI) data records 507, point data records 509, high definition (HD) mapping data records 511, and indexes 513, for example. The geographic data 501 may include more, fewer or different data records. In some embodiments, additional data records not shown in FIG. 5 may also be included, such as cartographic ("carto") data records, routing data records, maneuver data records, and other data records.

In particular, the HD mapping data records 511 may include a variety of data, including data with resolution sufficient to provide centimeter-level or better accuracy of map features. For example, the HD mapping data may include data captured using LiDAR, or equivalent technology capable large numbers of 3D points, and modelling road surfaces and other map features down to the number lanes and their widths. In one embodiment, the HD mapping data (e.g., HD data records 511) capture and store details such as the slope and curvature of the road, lane markings, roadside objects such as signposts, including what the signage denotes. By way of example, the HD mapping data enable highly automated vehicles to precisely localize themselves on the road.

In some implementations, geographic features (e.g., two-dimensional or three-dimensional features) may be represented in the geographic database 107 using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, a shadow, and a three-dimensional polygon extrusion can be used to represent the three-dimensional surfaces of the building, shadows and so on. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107:

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In some implementations, certain conventions or rules may be followed in the geographic database 107. For example, links may not cross themselves or each other except at a node. In another example, shape points, nodes, or links may not be duplicated. In yet another example, two links that connect each other may have a common node. In the geographic database 107, overlapping geographic features are represented by overlapping polygons. When polygons overlap, the boundary of one polygon crosses the boundary of the other polygon.

In the geographic database 107, the location at which the boundary of one polygon intersects the boundary of another polygon may be represented by a node. In one embodiment, a node may be used to represent other locations along the boundary of a polygon than a location at which the boundary of the polygon intersects the boundary of another polygon. In one embodiment, a shape point may not be used to represent a point at which the boundary of a polygon intersects the boundary of another polygon.

In exemplary embodiments, the road segment data records 505 may be links or segments representing roads, streets, or paths, as can be used in the calculated route or recorded route information for determination of one or more personalized routes. The node data records 503 may be end points corresponding to the respective links or segments of the road segment data records 505. The road link data records 505 and the node data records 503 may represent a road network, as used by vehicles, cars, and/or other entities, for instance. Alternatively, the geographic database 107 may contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, structures, stores, parks, etc. The geographic database 505 can include data about the POIs and their respective locations in the POI data records 507. The geographic database 107 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

As shown in FIG. 5, the geographic database 107 may also include point data records 509 for storing the point data, map features, as well as other related data used according to the various embodiments described herein. In addition, the point data records 509 can also store ground truth training and evaluation data, machine learning models, annotated observations, and/or any other data. By way of example, the point data records 509 can be associated with one or more of the node records 503, road segment records 505, and/or POI data records 507 to support verification, localization or visual odometry based on the features stored therein and the corresponding estimated quality of the features. In this way, the records 509 can also be associated with or used to classify the characteristics or metadata of the corresponding records 503, 505, and/or 507.

As discussed above, the HD mapping data records 511 may include models of road surfaces and other map features to centimeter-level or better accuracy. The HD mapping data records 511 may also include models that provide the precise lane geometry with lane boundaries, as well as rich attributes of the lane models. These rich attributes may include, but are not limited to, lane traversal information, lane types, lane marking types, lane level speed limit information, and/or the like. In one embodiment, the HD mapping data records 511 may be divided into spatial partitions of varying sizes to provide HD mapping data to vehicles and other end user devices with near real-time speed without overloading the available resources of these vehicles and devices (e.g., computational, memory, bandwidth, etc. resources).

In some implementations, the HD mapping data records 511 may be created from high-resolution 3D mesh or point-cloud data generated, for instance, from LiDAR-equipped vehicles. The 3D mesh or point-cloud data may be processed to create 3D representations of a street or geographic environment at centimeter-level accuracy for storage in the HD mapping data records 511.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

The geographic database 107 may be maintained by content provider in association with a services platform (e.g., a map developer), as described with reference to FIG. 1. The map developer can collect geographic data to generate and enhance the geographic database 107. The data may be collected in various ways by the map developer, including obtaining data from other sources, such as municipalities or respective geographic authorities. In addition, the map developer can employ field personnel to travel by vehicle along roads throughout the geographic area of interest to observe features and/or record information about them, for example. Also, remote sensing, such as aerial or satellite photography, can be used.

In some implementations, the geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device of a vehicle, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The indexes 513 in FIG. 5 may be used improve the speed of data retrieval operations in the geographic database 107. Specifically, the indexes 513 may be used to quickly locate data without having to search every row in the geographic database 107 every time it is accessed. For example, in one embodiment, the indexes 513 can be a spatial index of the polygon points associated with stored feature polygons.

Figure 6:
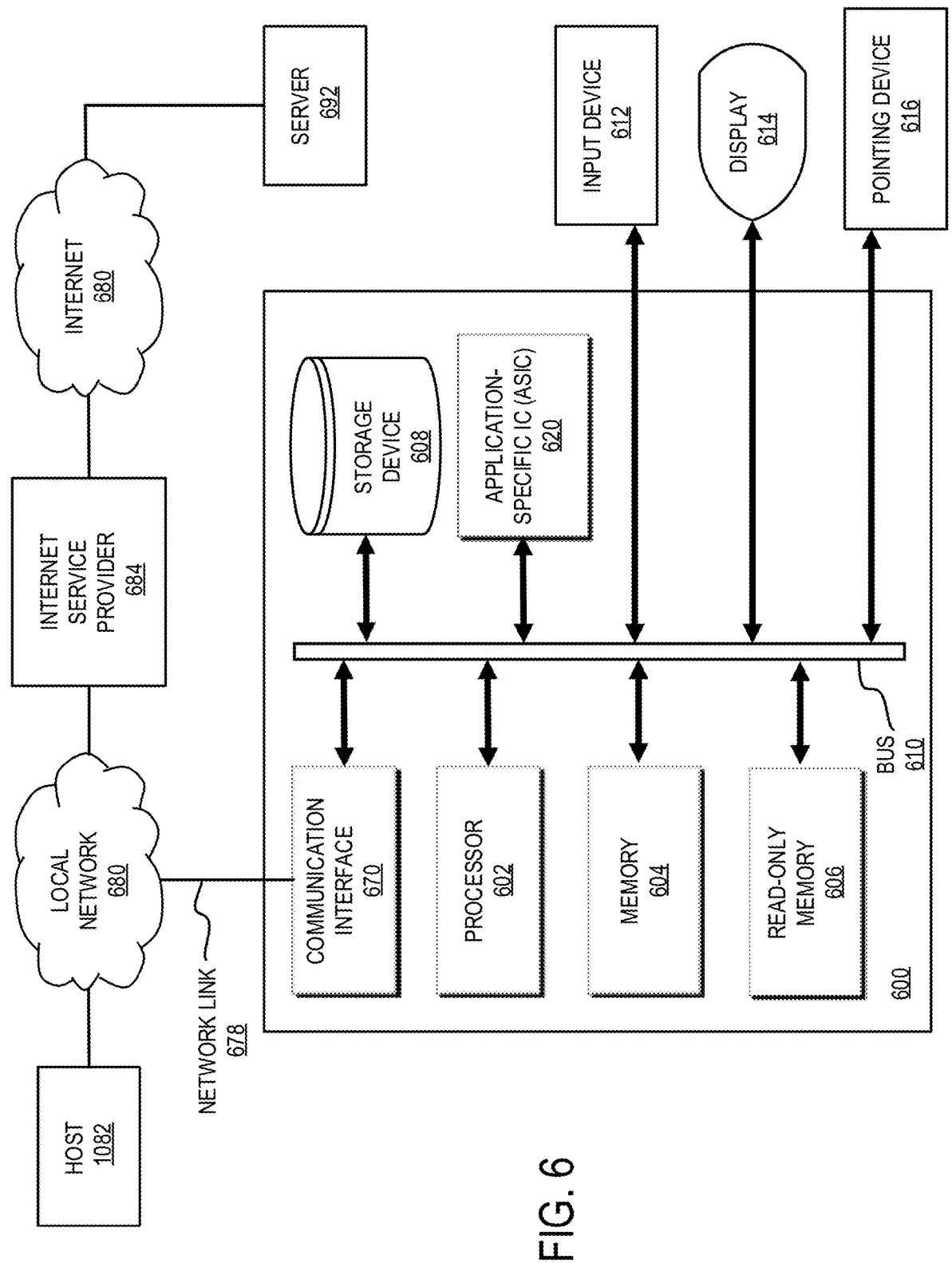
FIG. 6 is a diagram of an example computer system, in accordance with aspects of the present disclosure.

An example computer system 600, in accordance with aspects of the present disclosure, is illustrated in FIG. 6. The computer system 600 may be programmed (e.g., via computer program code or instructions) to perform a variety of steps, including steps for generating line-of-sight information using imagery, in accordance with methods described herein.

As shown in FIG. 6, the computer system 600 may generally include a processor 602, which may be configured to perform a set of operations on information as specified by computer program code. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). In some aspects, the set of operations may include bringing information in from a bus 610 and placing information on the bus 610. The set of operations may also include comparing two or more units of information, shifting positions of units of information, and combining two or more units of information, such as by addition or multiplication or logical operations like OR, exclusive OR (XOR), and AND. Each operation of the set of operations performed by the processor 602 may be represented to the processor 602 by information called instructions, such as an operation code of one or more digits. The sequence of operations to be executed by the processor 602, such as a sequence of operation codes, constitute processor 602 instructions, may also be called computer system 600 instructions or, simply, computer instructions. The processor 602 may include multiple processors, units or modules, and may be implemented as mechanical, electrical, magnetic, optical, chemical or quantum components, among others, or any combination thereof.

As shown in FIG. 6, the computer system 600 may also include a memory 604 coupled to bus 610. The memory 604, such as a random-access memory (RAM) or other dynamic storage device, may be configured to store a variety of information and data, including processor instructions for carrying steps in accordance with aspects of the disclosure. Dynamic memory allows information stored therein to be changed by the computer system 600. The RAM allows a unit of information stored at a location called a memory address to be stored and retrieved independently of information at neighboring addresses. The memory 604 may also be used by the processor 602 to store temporary values during execution of processor instructions.

The computer system 600 may also include a read-only memory (ROM) 606, or other static storage device, coupled to the bus 610. The ROM 606 may be configured for storing static information, including instructions, that is not changed by the computer system 600. Some memory 604 includes volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

As mentioned, the bus 610 may be configured for passing information and data between internal and external components of the computer system 600. To do so, the bus 610 may include one or more parallel conductors that facilitate quick transfer of information and data among the components coupled to the bus 610. The information and data may be represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, may represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, analog data may be represented by a near continuum of measurable values within a particular range.

Information, including instructions for generating line-of-sight information, may be provided to the bus 610 for use by the processor 602 from an external input device 612, such as a keyboard or a sensor. The sensor may be configured to detect conditions in its vicinity and transform those detections into physical expression compatible with the measurable phenomenon used to represent information in computer system 600. Other external devices coupled to bus 610, used primarily for interacting with humans, may include a display device 614, such as a cathode ray tube (CRT) or a liquid crystal display (LCD), or plasma screen or printer for presenting text or images, as well as a pointing device 616 (e.g. a mouse, trackball, cursor direction keys, motion sensor, etc) for controlling a position of a small cursor image presented on the display 614 and issuing commands associated with graphical elements presented on the display 614. In some embodiments, for example, the computer system 600 performs all functions automatically without human input. As such, one or more of external input device 612, display device 614 and pointing device 616 may be omitted.

As shown in FIG. 6, special purpose hardware, such as an application specific integrated circuit (ASIC) 620, may be coupled to bus 610. The special purpose hardware may be configured to perform specialized operations. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 may also include one or more instances of a communications interface 670 coupled to bus 610. The communication interface 670 may provide a one-way or two-way communication coupling to a variety of external devices that operate with their own processors, such as printers, scanners and external disks. In addition, the communication interface 670 may provide a coupling to a local network 680, by way of a network link 678. The local network 680 may provide access to a variety of external devices and systems, each having their own processors and other hardware. For example, the local network 680 may provide access to a host 682, or an internet service provider 684, or both, as shown in FIG. 6. The internet service provider 684 may then provide access to the internet 690, in communication with various other servers 692.

By way of example, the communication interface 670 may include a parallel port or a serial port or a universal serial bus (USB) port on a personal computer. In some embodiments, the communications interface 670 may include one or more integrated services digital network (ISDN) cards, or digital subscriber line (DSL) cards, or telephone modems that provides an information communication connection to a corresponding type of telephone line. In some embodiments, the communication interface 670 may include a cable modem that converts signals on bus 610 into signals for a communication connection over a coaxial cable or into optical signals for a communication connection over a fiber optic cable. As another example, the communications interface 670 may be a local area network (LAN) card configured to provide a data communication connection to a compatible LAN, such as Ethernet. Wireless links may also be implemented. For wireless links, the communications interface 670 may send and/or receive electrical, acoustic or electromagnetic signals, including infrared and optical signals, that carry information streams, including digital data. For example, in wireless handheld devices (e.g. mobile telephones, cell phones, and so forth), the communications interface 670 may include a radio band electromagnetic transmitter and receiver called a radio transceiver. In certain embodiments, the communications interface 670 enables connection to the communication network, as described with reference to FIG. 1.

As used herein, computer-readable media refers to any media that participates in providing information to processor 602, including instructions for execution. Such media may take many forms, and include non-volatile media, volatile media, transmission media, and others. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 7:
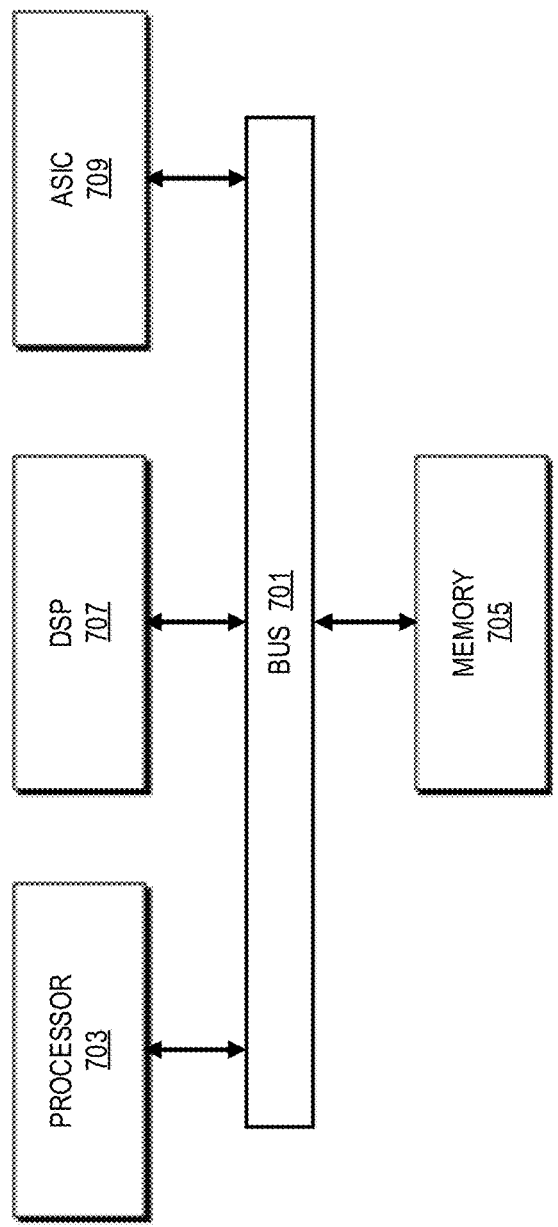
FIG. 7 is a diagram of an example chip set, in accordance with aspects of the present disclosure.

Turning now to FIG. 7, a chip set 700, in accordance with aspects of the present disclosure, is illustrated. In some implementations, the chip set 700 may be programmed to carry out steps in accordance with methods described herein, and may include various components (e.g. as described with respect to FIG. 6) incorporated in one or more physical packages (e.g., chips). By way of example, a physical package includes an arrangement of one or more materials, components, and/or wires on a structural assembly (e.g., a baseboard) that provides one or more characteristics, such as physical strength, conservation of size, and/or limitation of electrical interaction. It is contemplated that in certain embodiments the chip set 700 can be implemented in a single chip.

As shown, the chip set 700 may include a communication mechanism, such as a bus 701 for passing information and data among the components of the chip set 1100. A processor 703 connected to the bus 701 may be configured to execute instructions and process information stored in, for example, a memory 705. The processor 703 may include one or more processing cores, with each core capable of performing independently. In some implementations, a multi-core processor may be used, which enables multiprocessing within a single physical package. Examples of a multi-core processor include two, four, eight, or greater numbers of processing cores. Alternatively, or additionally, the processor 703 may include one or more microprocessors configured in tandem, via the bus 701, to perform independent execution of instructions, pipelining, and multithreading.

The chip set 700 may also include specialized components configured to perform certain processing functions and tasks. For instance, the chip set 700 may include one or more digital signal processors (DSP) 707, or one or more application-specific integrated circuits (ASIC) 709, or both. In particular, the DSP 707 may be configured to process real-world signals (e.g., sound) in real time independently of the processor 703. Similarly, the ASIC 709 may be configured to performed specialized functions not easily performed by a general-purpose processor. Other specialized components to aid in performing the inventive functions described herein may include one or more field programmable gate arrays (FPGA) (not shown), one or more controllers (not shown), or one or more other special-purpose computer chips.

The processor 703 and accompanying components may have connectivity to the memory 705 via the bus 701, as shown. The memory 705 may include dynamic memory (e.g., RAM, magnetic disk, writable optical disk, etc.), static memory (e.g., ROM, CD-ROM, etc.), and others, configured for storing executable instructions. The instructions, when executed, perform a variety of steps, including steps for identifying the quality of terrestrial data, in accordance with methods described herein. The memory 705 may also store the data associated with or generated by the execution.

Figure 8:
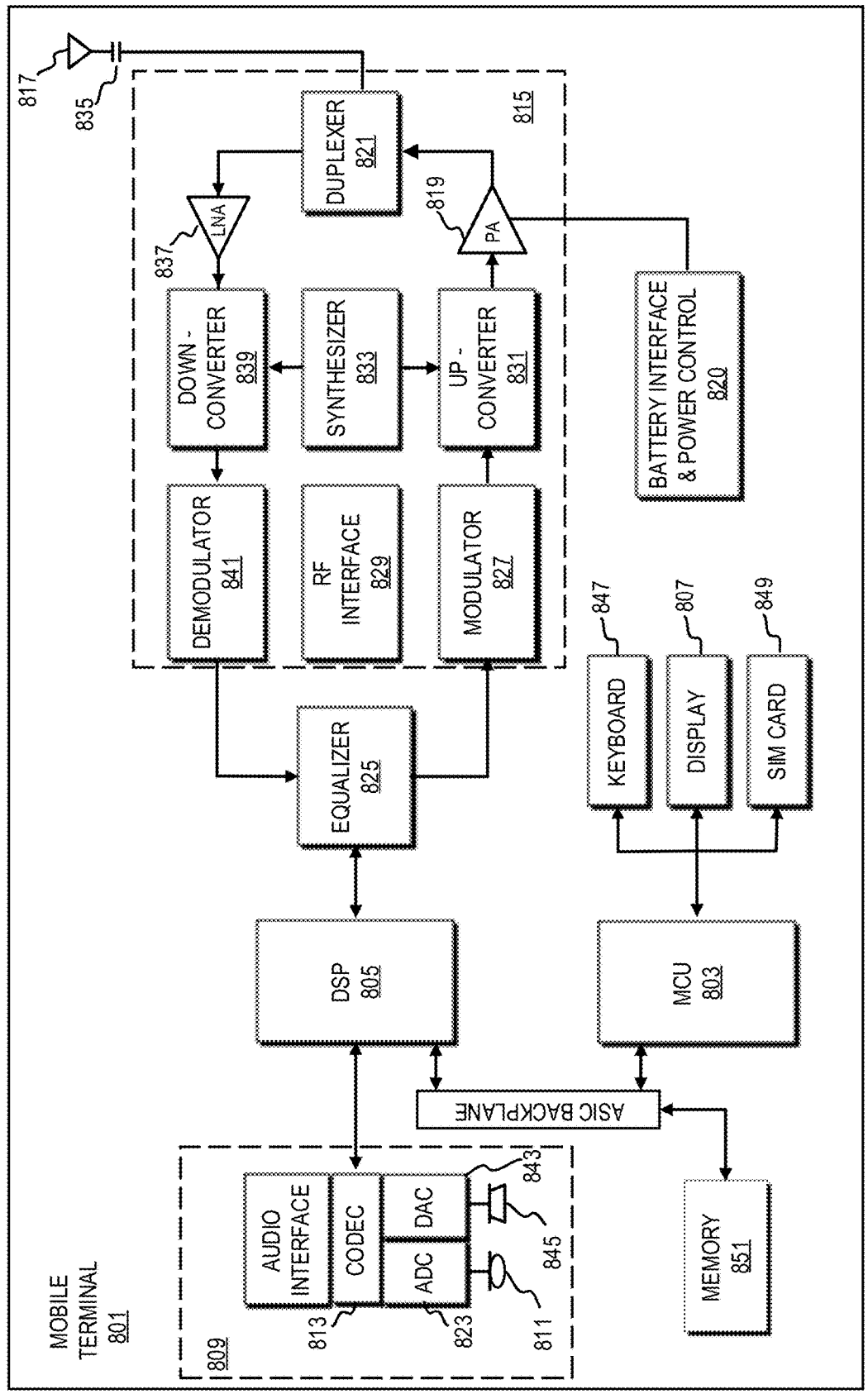
FIG. 8 is a diagram of an example mobile terminal, in accordance with aspects of the present disclosure.

Turning to FIG. 8, a diagram of an example mobile terminal 801 is shown. In some implementations, the mobile terminal 801 may be an embedded component of the vehicle 105 or UE 109, as described with reference to FIG. 1.

In general, the mobile terminal 801 may include a Main Control Unit (MCU) 803, a Digital Signal Processor (DSP) 805, and a receiver/transmitter unit including a microphone gain control unit and a speaker gain control unit. A display 807 provides feedback to user in support of various applications and functions of the mobile terminal 801. The mobile terminal 801 may also include audio function circuitry 809, including a microphone 811 and microphone amplifier that amplifies the sound signal output from the microphone 811. The amplified sound signal output from the microphone 811 is fed to a coder/decoder (CODEC) 813.

The mobile terminal 801 may also include a radio section 815, which amplifies power and converts frequency in order to communicate with a base station, which is included in a mobile communication system, via antenna 817. Generally, a radio receiver is often defined in terms of front-end and back-end characteristics. The front-end of the receiver encompasses all of the Radio Frequency (RF) circuitry whereas the back-end encompasses all of the base-band processing circuitry. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The MCU 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to determine ground control points from image data. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 may include the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory 851 may be, but not is limited to, a single memory, CD, DVD, ROM, RAM, EEPROM, optical storage, or any other non-volatile or non-transitory storage medium capable of storing digital data.

An optionally incorporated SIM card 849 may carry, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. It should be appreciated that many equivalents, alternatives, variations, and modifications, aside from those expressly stated, are possible and may be considered within the scope of the invention.

The invention claimed is:

1. A method for generating line-of-sight information using imagery, the method comprising:
   receiving a raster image depicting at least one object in a region of interest;
   measuring a shadow of the at least one object in the raster image;
   determining an angle of the sun from the shadow of the at least one object;
   creating a plurality of virtual shadows for the at least one object using the angle of the sun;
   generating line-of-sight information for the at least one object based on an intersection of the plurality of virtual shadows with objects in the region of interest.

2. The method of claim 1, wherein the raster image is an aerial image or a satellite image.

3. The method of claim 1, wherein the method further comprises:
   processing pixel values of the raster image to identify pixels that correspond to the shadow of the at least one object; and
   generating a representation of the shadow using pixels that are identified.

4. The method of claim 3, wherein the method further comprises modifying the representation of the shadow based one a shape of the at least one object, wherein the representation of the shadow is modified to correspond to the shape of the at least one object.

5. The method of claim 3, wherein the method further comprises:
   translating a representation of the at least one object toward an edge of the representation of the shadow; and
   modifying the pixel values of respective pixels of the shadow to align the edge of the representation of the shadow with the translated representation of at least one object.

6. The method of claim 1, wherein the method further comprises determining the angle of the sun using height information associated with the at least one object.

7. The method of claim 1, wherein the method further comprises:
   computing a maximum angle of the sun based on the angle; and
   creating the plurality of virtual shadows by simulating a position of the sun at the maximum angle, wherein a length the plurality of virtual shadows is maximized at the maximum angle.

8. The method of claim 7, wherein the method further comprises varying the position of the sun over 360°.

9. The method of claim 1, wherein the method further comprises generating a plurality of modified shadows by adjusting the plurality of virtual shadows based on the intersection with objects in the region of interest.

10. The method of claim 9, wherein the method further comprises generating the line-of-sight information using the plurality of modified shadows.

11. A system for generating line-of-sight information, the system comprising:
at least one processor;
at least one memory comprising instructions executable by the at least one processor, the instructions causing the system to:
receive a raster image depicting at least one object in a region of interest;
measure a shadow of the at least one object in the raster image;
determine an angle of the sun from the shadow of the at least one object;
create a plurality of virtual shadows for the at least one object using the angle of the sun;
generate line-of-sight information for the at least one object based on an intersection of the plurality of virtual shadows with objects in the region of interest; and
generate a report comprising the line-of-sight information; and
a display for providing the report to a user.

12. The system of claim 11, wherein the instructions further cause the system to:
process pixel values of the raster image to identify pixels that correspond to the shadow of the at least one object; and
generate a representation of the shadow using pixels that are identified.

13. The system of claim 12, wherein the instructions further cause the system to modify the representation of the shadow based one a shape of the at least one object, wherein the representation of the shadow is modified to correspond to the shape of the at least one object.

14. The system of claim 13, wherein the instructions further cause the system to:
translate a representation of the at least one object toward an edge of the representation of the shadow; and
modify the pixel values of respective pixels of the shadow to align the edge of the representation of the shadow with the translated representation of at least one object.

15. The system of claim 11, wherein the instructions further cause the system to determine the angle of the sun using height information associated with the at least one object.

16. The system of claim 11, wherein the instructions further cause the system to:
compute a maximum angle of the sun based on the angle; and
create the plurality of virtual shadows by simulating a position of the sun at the maximum angle, wherein a length the plurality of virtual shadows is maximized at the maximum angle.

17. The system of claim 16, wherein the instructions further cause the system to vary the position of the sun over 360° to create the plurality of virtual shadows.

18. The system of claim 11, wherein the instructions further cause the system to generate a plurality of modified shadows by adjusting the plurality of virtual shadows based on the intersection with one or more objects in the region of interest.

19. The system of claim 18, wherein the instructions further cause the system to generate the line-of-sight information using the plurality of modified shadows.

20. A non-transitory computer-readable storage medium, carrying one or more sequences of one or more instructions which, when executed by one or more processors, cause an apparatus to perform steps to:
receive a raster image depicting at least one object in a region of interest;
measure a shadow of the at least one object in the raster image;
determine an angle of the sun from the shadow of the at least one object;
create a plurality of virtual shadows for the at least one object using the angle of the sun;
generate line-of-sight information for the at least one object based on an intersection of the plurality of virtual shadows with objects in the region of interest;
generate a report comprising the line-of-sight information; and
transmit or cause a presentation of the report.

* * * * *